(12) United States Patent
Braundmeier (10) Patent No.: US 10,885,168 B2
(45) Date of Patent: Jan. 5, 2021

(54) USER AUTHENTICATION VIA FINGERPRINT AND HEARTBEAT

(71) Applicant: MasterCard International Incorporated, Purchase, NY (US)

(72) Inventor: Aaron Braundmeier, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 194 days.

(21) Appl. No.: 15/822,114

(22) Filed: Nov. 24, 2017

(65) Prior Publication Data

US 2019/0163888 A1 May 30, 2019

(51) Int. Cl.
| | | |
|---|---|---|
| G06F 21/32 | (2013.01) | |
| G06F 21/40 | (2013.01) | |
| H04L 29/06 | (2006.01) | |
| G06F 21/31 | (2013.01) | |

(52) U.S. Cl.
CPC .............. G06F 21/32 (2013.01); G06F 21/31 (2013.01); G06F 21/40 (2013.01); H04L 63/0861 (2013.01); H04L 63/20 (2013.01); H04L 2463/082 (2013.01)

(58) Field of Classification Search
CPC ..... G06F 21/32; G06F 21/31; H04L 63/0861; H04L 2463/082
See application file for complete search history.

(56) References Cited

U.S. PATENT DOCUMENTS

| | | | |
|---|---|---|---|
| 5,920,640 A | 7/1999 | Salatino et al. | |
| 8,392,965 B2 * | 3/2013 | Carter | G06F 21/34 |
| | | | 726/2 |
| 9,898,901 B1 * | 2/2018 | Kurian | G07F 19/205 |
| 9,928,355 B2 * | 3/2018 | Boshra | G06F 16/5854 |
| 9,953,231 B1 * | 4/2018 | Medina, III | G10L 17/00 |
| 10,110,385 B1 * | 10/2018 | Rush | H04L 9/3297 |
| 10,423,768 B2 * | 9/2019 | Martin Perez | H04W 12/0605 |
| 2008/0157921 A1 * | 7/2008 | Hendriks | G06K 9/00013 |
| | | | 340/5.83 |
| 2009/0133106 A1 * | 5/2009 | Bentley | G06F 21/31 |
| | | | 726/5 |

(Continued)

OTHER PUBLICATIONS

Alajlan, N., Islam, M.S. and Ammour, N., Dec. 2013. Fusion of fingerprint and heartbeat biometrics using fuzzy adaptive genetic algorithm. In World Congress on Internet Security (WorldCIS-2013) (pp. 76-81). IEEE. (Year: 2013).*

*Primary Examiner* — James R Turchen (57) ABSTRACT

The methods described herein are configured for authenticating a user identity. Fingerprint data is collected from a digit via a fingerprint sensor and heartbeat data is collected from the digit, via an optical heartbeat sensor, based on light projected from a light source. The collected fingerprint data is verified by comparison to stored fingerprint data associated with the user identity. The collected heartbeat data is used to detect the presence of a heartbeat. Based on a successful verification of the collected fingerprint data and a successful detection of the heartbeat, the user identity is authenticated. Authenticating the user identity based on both fingerprint data and heartbeat data enhances the security of the authentication process by preventing fraudulent use of fingerprints.

20 Claims, 5 Drawing Sheets

(56) References Cited

U.S. PATENT DOCUMENTS

| | | | |
|---|---|---|---|
| 2010/0113950 A1 | 5/2010 | Lin et al. | |
| 2010/0113952 A1* | 5/2010 | Raguin | G06K 9/036 600/509 |
| 2013/0198056 A1* | 8/2013 | Aldrey | G06Q 30/0201 705/38 |
| 2013/0307670 A1* | 11/2013 | Ramaci | G06Q 10/10 340/5.82 |
| 2014/0068726 A1* | 3/2014 | Jakobsson | G06F 21/31 726/5 |
| 2014/0165184 A1* | 6/2014 | Lange | G06F 21/32 726/19 |
| 2015/0046996 A1* | 2/2015 | Slaby | H04L 63/0861 726/7 |
| 2015/0242605 A1* | 8/2015 | Du | G06F 21/31 726/7 |
| 2015/0261946 A1* | 9/2015 | Yoon | A61B 5/02438 726/19 |
| 2016/0063233 A1* | 3/2016 | Bae | H04L 63/0861 726/19 |
| 2016/0092665 A1* | 3/2016 | Cowan | G06F 21/35 726/9 |
| 2016/0246396 A1* | 8/2016 | Dickinson | G06F 3/0412 |
| 2016/0283698 A1* | 9/2016 | Huang | H04W 12/02 |
| 2016/0283703 A1* | 9/2016 | Allyn | G06F 21/32 |
| 2017/0124370 A1* | 5/2017 | He | G06K 9/0002 |
| 2017/0140376 A1* | 5/2017 | Carraway | H04L 51/36 |
| 2017/0316248 A1* | 11/2017 | He | G06K 9/036 |
| 2018/0004924 A1* | 1/2018 | Tieu | G06F 21/6218 |
| 2018/0007062 A1* | 1/2018 | Maheshwari | G06F 21/45 |
| 2018/0012228 A1* | 1/2018 | Milevski | G06Q 20/322 |
| 2018/0019986 A1* | 1/2018 | Manohar | H04L 63/0861 |
| 2018/0032709 A1* | 2/2018 | Martin Perez | H04W 12/0605 |
| 2018/0082304 A1* | 3/2018 | Summerlin | G06Q 20/4016 |
| 2018/0101718 A1* | 4/2018 | Lowe | G06Q 20/34 |
| 2019/0019195 A1* | 1/2019 | Dunjic | G06Q 20/4016 |
| 2019/0061772 A1* | 2/2019 | Prinz | A61B 5/747 |
| 2019/0392125 A1* | 12/2019 | Lee | A61B 5/04 |

* cited by examiner

USER AUTHENTICATION VIA FINGERPRINT AND HEARTBEAT

BACKGROUND

Current mobile devices, such as mobile phones, tablets, and laptops, make use of fingerprint reading technology for authenticating users. Fingerprint readers may include optical sensors that read light reflected from a user's finger or thumb, or contact-based sensors that detect patterns or points of contact of a user's finger or thumb. Fingerprint authentication provides a fast, user-friendly method of user authentication, but it has been shown to be vulnerable to fraudulent use. Throughout everyday life, users leave their fingerprints on many different surfaces, and an enterprising criminal may be able to collect these inadvertent fingerprints and mimic them (e.g., imprinting fingerprints onto clay or other materials, etc.) to access users' devices, applications, or accounts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for authenticating a user identity, the method comprises collecting, via a fingerprint sensor, fingerprint data from a digit and collecting, via an optical heartbeat sensor, heartbeat data from the digit based on light projected from a light source. The collected fingerprint data is verified by comparison to stored fingerprint data associated with the user identity. The collected heartbeat data is used to detect the presence of a heartbeat. Based on a successful verification of the collected fingerprint data and a successful detection of the heartbeat, the user identity is authenticated.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide secure user authentication while preventing exploitative methods of falsifying fingerprints from being used to gain access to users' devices and accounts. The computing devices and methods described below are configured to securely authenticate a user identity based on provided fingerprint and heartbeat data. The fingerprint data and heartbeat data are collected or otherwise received by sensors (e.g., optical sensors, etc.) of a computing device. The fingerprint data is verified based on comparison to stored fingerprint data associated with a user identity. The heartbeat data is used to detect whether a heartbeat is present based on known and/or typical heartbeat patterns. When the fingerprint data verification is successful and a heartbeat is detected, the user identity is authenticated. The user identity authentication may be executed in association with a variety of different purposes, such as unlocking a computing device, confirming transactions, signing in to applications, accessing settings of a computing device, etc.

The use of heartbeat detection in conjunction with fingerprint verification provides a user-friendly method of authentication that is secure against many known methods of exploiting fingerprint verification alone. Additionally, use of the user authentication methods described herein reduces reliance on slower and/or less secure authentication methods, such as password or personal identification number (PIN) authentication, personal information questions, or the like. User interaction during authentication is both shortened and streamlined, as the user can initiate authentication by placing a digit on the sensors and holding it there for a few seconds. This is an improvement over the time and effort required for entering a password or PIN.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

Figure 1:
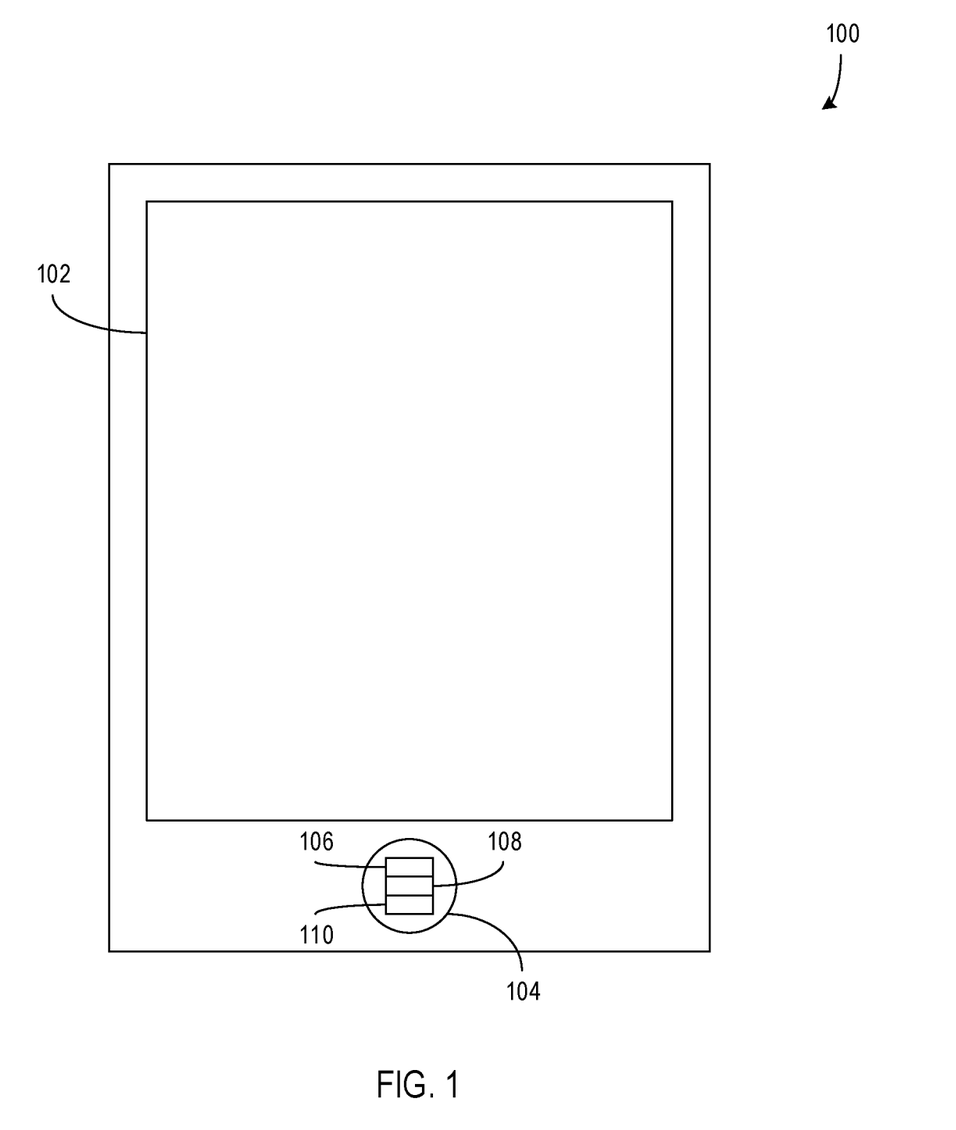
FIG. 1 is an exemplary block diagram illustrating a computing device configured for user authentication based on fingerprint and heartbeat data according to an embodiment.

FIG. 1 is an exemplary block diagram illustrating a computing device 100 configured for user authentication based on fingerprint and heartbeat data according to an embodiment. The computing device 100 (e.g., a mobile phone, tablet, laptop, etc.) includes a user interface 102 and a sensor region 104. The sensor region 104 includes a fingerprint sensor 106, a heartbeat sensor 108, and an associated light source 110.

In some examples, the user interface 102 includes a display and/or touchscreen enabling a user to view output from the computing device 100 and/or provide input to the computing device 100. The computing device 100 and/or user interface 102 may further include other interfaces, such as speakers, a microphone, a headphone jack or other peripheral interface, etc.

The sensor region 104 is arranged on the computing device 100 such that a user's digit (e.g., a finger, a thumb, etc.) can be placed over the sensor region 104. The fingerprint sensor 106 may collect fingerprint data from the user's digit when it is placed in the sensor region 104, while the heartbeat sensor 108 may collect heartbeat data from the user's digit at the same time or approximately at the same time (e.g., within 2 seconds, 1 second, or 100 ms, etc.).

In some examples, a user must make contact with the sensor region 104 in order for the fingerprint sensor 106 and heartbeat sensor 108 to collect fingerprint data and heartbeat data respectively. The sensors 106 and 108 may remain inactive until contact with the sensor region 104 is detected. Upon contact, the fingerprint sensor 106 may collect the user's fingerprint based on light (e.g., from the light source 110, etc.) reflected from the user's digit to the fingerprint sensor 106. Alternatively, or additionally, the fingerprint sensor 106 may include a contact or touch-based sensor that collects the user's fingerprint based on patterns or points of contact of the user's digit on the surface of the sensor region 104 and/or the fingerprint sensor 106.

The heartbeat sensor 108 is an optical sensor. In some examples, when a user's digit covers the sensor region 104, the heartbeat sensor 108 is activated and the light source 110 (e.g., a light emitting diode (LED), etc.) projects light into the tissue of the user's digit, including blood vessels within the user's digit. The user's heartbeat causes contraction and expansion of the blood vessels, causing variations in the light reflected from the user's digit to the heartbeat sensor 108. The heartbeat sensor 108 collects heartbeat data from the digit based on variations in the reflected light. A user's heartbeat may be detected based on the collected heartbeat data, including the presence of a heartbeat, a rate of a heartbeat, or the like. Additionally, or alternatively, the heartbeat sensor 108 collects the heartbeat data through other methods, such as non-optical methods. For instance, the heartbeat sensor 108 may collect electrical data via electrodes on the user's skin that is indicative of the heartbeat of the user (e.g., via electrocardiography (ECG), etc.).

Figure 2:
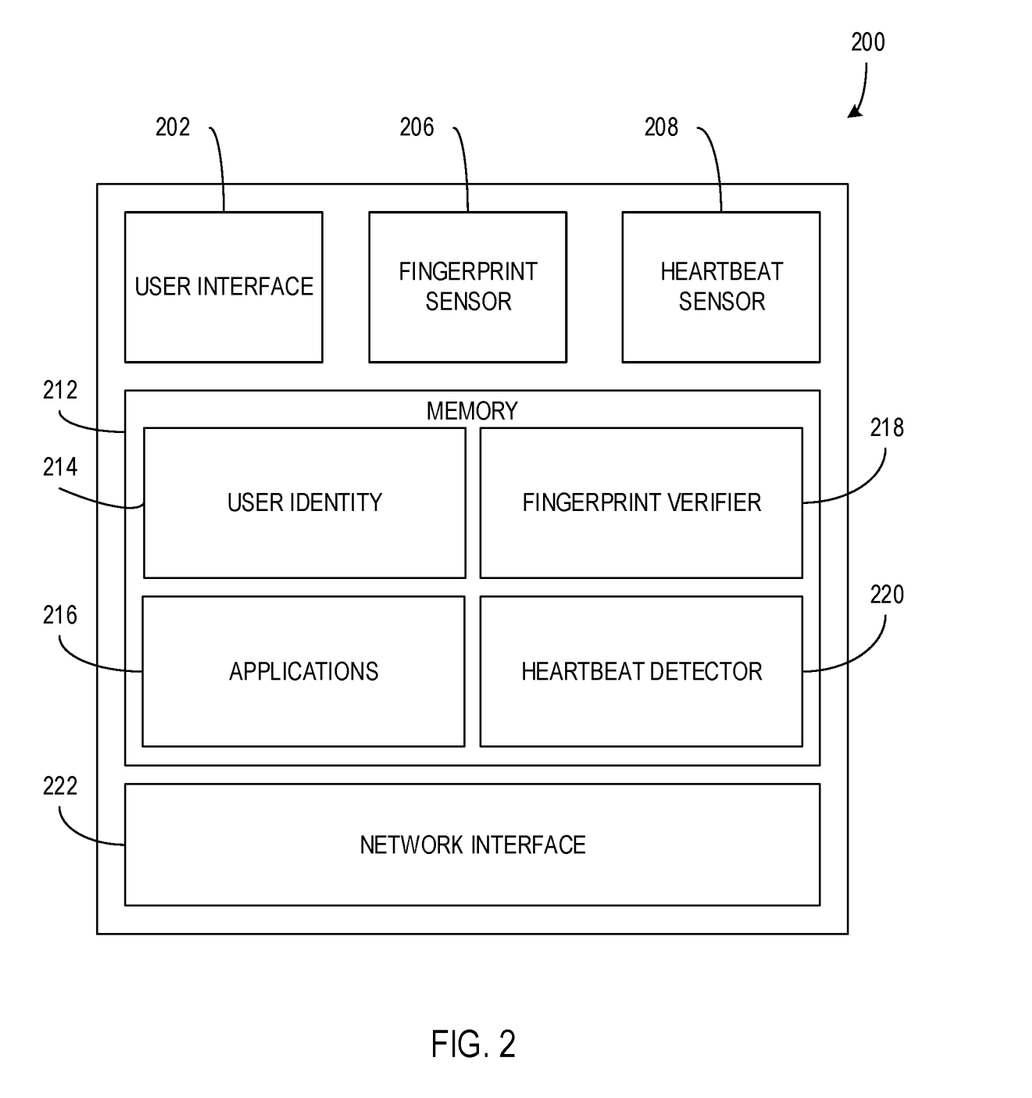
FIG. 2 is an exemplary block diagram illustrating hardware and software aspects of a computing device configured for user authentication based on fingerprint and heartbeat data according to an embodiment.

FIG. 2 is an exemplary block diagram illustrating hardware and software aspects of a computing device 200 configured for user authentication based on fingerprint and heartbeat data according to an embodiment. The computing device 200 includes a user interface 202, a fingerprint sensor 206, and a heartbeat sensor 208 as described above with respect to computing device 100. Further, the computing device 200 includes a memory 212 storing a user identity 214, applications 216, a fingerprint verifier 218 and a heartbeat detector 220. Also, the computing device 200 includes a network interface 222 (e.g., a wired interface, cellular network interface, Wi-Fi network interface, other wireless network interface, etc.) enabling communications with other devices, servers, or the like over networks.

The user identity 214 includes a unique user profile associated with a user. In some examples, the computing device 200 includes multiple user identities 214 associated with different users. The user identity 214 includes stored fingerprint data associated with one or more digits of the user. The stored fingerprint data may have been configured with the user identity 214 prior to use during user authentication and/or after some user authentication attempts as described herein. The stored fingerprint data is used to match with collected fingerprint data from the fingerprint sensor 206 when authenticating the user identity 214 with the current user. Additionally, the user identity 214 may include an associated password, pass code, or the like that can be used for user authentication in addition to or instead of the matched fingerprint data. Further, the user identity 214 may include additional customized authentication settings that may be applied in combination with the fingerprint/heartbeat authentication described herein.

In some examples, the user identity 214 may include authentication settings that enable a user to authenticate his/her identity using different digits for different types of authentications. For instance, an authentication setting may enable the user to authenticate with his/her right thumb to unlock the computing device 200 for use, while the user may authenticate with his/her right index finger to confirm a payment transaction in a payment application (e.g., an application 216, etc.). Alternatively, or additionally, the authentication settings may be configured to enable the user to authenticate based on more than one digit for a particular purpose, such as a user being enabled to unlock the computing device 200 with any of his/her digits.

Additionally, authentication settings may be configured to determine when, and to what degree, fingerprint/heartbeat authentication is required. For instance, an authentication setting may be set that determines that fingerprint/heartbeat authentication is not required when the computing device 200 is connected to a trusted Wi-Fi access point, or when the computing device 200 is located within a defined distance of the user's home or other trusted location. Alternatively, a degree to which a fingerprint/heartbeat match is required may be reduced to a lower threshold when in a trusted location, etc. Other sensors (gyroscopes, accelerometers, microphones, etc.), components and/or data (e.g., date, time, day of the week, etc.) of the computing device 200 may also be used in authentication settings that affect authentication as described herein. For instance, an authentication setting may be configured to require authentication during the day (e.g., 8 A.M.-8 P.M.) and automatically authenticate at night (e.g., 8 P.M.-8 A.M.) if the user is likely to be in the privacy of his/her home at night. Alternatively, or additionally, an authentication setting may be configured to require authentication after a defined degree of movement is detected by an accelerometer.

Further, authentication settings may be configured to provide automatic authentication within a defined time period of a successful authentication based on a fingerprint and detected heartbeat as described herein. For instance, after a successful authentication, the user may be automatically authenticated for up to 30 minutes. Other time periods (e.g., 10 minutes, 1 hour, etc.) are also contemplated.

Authentication settings as described may also be combined to enable flexible authentication processes. For instance, an application setting may cause an automatic authentication time period to be activated after a successful authentication when the computing device is connected to a trusted network and/or when the computing device is within a defined range of a user's home. Further, the authentication setting may only apply to defined authentication purposes, applications, or the like. Other authentication settings that provide specific rules and/or requirements for authentication using fingerprint data and heartbeat data as described herein are also contemplated.

Applications 216 are software components that interact with the hardware and/or other software of the computing device 200 to provide a variety of functionality to the user of the computing device. For instance, applications 216 may include banking applications, shopping applications, social media applications, messaging applications, games, peer to peer payment applications, etc. The applications 216 may be configured to display output on the user interface 202, collect data from the sensors 206 and 208, communicate via the network interface 222, etc. Further, the applications 216 may be configured to make use of the user identity 214, the fingerprint verifier 218, and/or the heartbeat detector 220 for user authentication (e.g., via application programming interfaces (APIs), etc.).

The fingerprint verifier 218 is a software component that authenticates fingerprint data collected by the fingerprint sensor 206 against stored fingerprint data associated with the user identity 214. The fingerprint data may include optical fingerprint data and/or contact-based fingerprint data as described above. The stored fingerprint data associated with the user identity 214 may be configured by the user prior to use of the fingerprint verifier 218 for verification.

The fingerprint verifier 218 compares the collected fingerprint data and stored fingerprint data and provides an indication of whether the collected fingerprint data is verified or not. In some examples, a match threshold (e.g., a number of matching data points, a percentage of matching data, etc.) is defined, such that, when the collected fingerprint data matches the stored fingerprint data to a degree that exceeds the match threshold, it is considered to be verified. For instance, the fingerprint data may comprise between 20 and 70 data points associated with a scanned digit and, to verify the scan, the fingerprint verifier 218 may match the fingerprint data points against 10, 15, or 20 stored fingerprint data points. Alternatively, the fingerprint verifier 218 may verify the scan based on matching 50%, 60%, or 75% of the collected fingerprint data points to stored fingerprint data points. Other numbers of collected data points and matching thresholds are also contemplated without departing from the description herein. The match threshold, which may be defined by a hardware manufacturer, a software engineer, or the like, may be set at a level that provides a balance of requiring a sufficiently confident match to ensure sufficient security and allowing for variation in the collected fingerprint data such that the user can reliably provide appropriate fingerprint data for authentication. Because the collection of the fingerprint data relies on the user placing their digit over the fingerprint sensor 206, the fingerprint verifier 218 accounts for variation in angle and/or orientation of the collected fingerprint data from the fingerprint sensor 206. The comparison of collected and stored fingerprint data may be implemented according to any appropriate fingerprint matching techniques as understood by a person of ordinary skill in the art without departing from the description herein.

In some examples, the fingerprint verifier 218 may compare collected fingerprint data against stored fingerprint data associated with more than one of the user's digits. The digits to which the fingerprint verifier 218 compares the collected fingerprint data may be determined based on authentication rules associated with the user identity 214 as described above. For instance, when the user is attempting to unlock the computing device 200 and the authentication settings of the user identity 214 enable the user to unlock the computing device 200 with any digit, the fingerprint verifier 218 may test collected fingerprint data against stored fingerprint data associated with all of the user's digits, or each of the user's digits in order until the stored fingerprint data matches the collected fingerprint data. Alternatively, when the user is attempting to confirm a payment transaction in a payment application 216 and the authentication settings of the user identity 214 enable the user to confirm a payment transaction with only one digit (e.g., a right thumb, a left index finger, etc.), the fingerprint verifier 218 may test collected fingerprint data against stored fingerprint data associated with that digit.

In some examples, the match threshold for a fingerprint data comparison may be defined according to an authentication setting of the user identity 214. For instance, a defined match threshold may be lower when it is more likely that the user is in possession of the computing device 200, such as when the computing device 200 is connected to a trusted Wi-Fi access point or within a defined range of a home location or other trusted location. Alternatively, a defined match threshold may be higher when it is less likely that the user is in possession of the computing device 200, such as when the computing device 200 is in an unrecognized location.

The heartbeat detector 220 receives collected heartbeat data from the heartbeat sensor 208 and compares it against stored heartbeat data to verify that the digit provided to the fingerprint sensor 206 is a legitimate digit and not an attempt to fraudulently verify a user identity 214 using a fake fingerprint. The heartbeat detector 220 may include stored heartbeat data that matches a variety of possible heartbeat data patterns that are considered legitimate.

The heartbeat detector 220 may require a defined time period (e.g., the average cardiac cycle is 0.8 seconds, so 2-3 seconds may be required, etc.) of collected heartbeat data to confirm the presence of a heartbeat. Further, the heartbeat detector 220 may also require a defined range of heartbeats detected during the defined time period and/or a defined degree of variation during each detected heartbeat. For instance, the heartbeat detector 220 may require that the number of heartbeats detected fall within a typical range of human heart rates to confirm the presence of a heartbeat. Additionally, or alternatively, the variation in the collected heartbeat data that represents a heartbeat may be required to fall within a defined variation range that represents typical human heartbeats. The comparison of collected and stored heartbeat data may be implemented according to any appropriate heartbeat detection techniques as understood by a person of ordinary skill in the art without departing from the description herein.

In some examples, the heartbeat detector 220 may detect a heartbeat rate, or heart rate, of the user. The heart rate may be used to indicate an emotional state, state of mind, or the like of the user. For instance, a fast heart rate may indicate that the user is nervous or otherwise agitated, while a heart rate in a normal range may indicate that the user is calm. The detected heart rate may be used during the authentication of the user identity 214 based on authentication settings associated with the user identity 214. For example, an authentication setting may require that the user's heart rate be within a prescribed range to confirm a payment transaction (e.g., the prescribed range may be a "normal resting heart rate" between 60 and 100 bpm, etc.). Additionally, the authentication setting may be limited to payment transactions of a defined amount or greater, such that large transactions are only confirmed when the user's heart rate indicates a calm state of mind, rather than an agitated state, but smaller transactions may be confirmed without consideration of the user's heart rate. The prescribed heart rate may further be adjusted based on the specific user to more accurately match the user's state of mind (e.g., an athlete may have a lower resting heart rate, so the required heart rate range may be adjusted to 40 bpm-80 bpm, etc.). Heart rate data may be collected from users and stored in an anonymized fashion to develop historic averages for associated users. In some examples, prescribed heart rate detection may also be used in determining whether a transaction should be flagged for suspicious activity (e.g., an abnormally high heart rate may indicate nervousness that is more likely to occur during suspicious activity, etc.).

Figure 3:
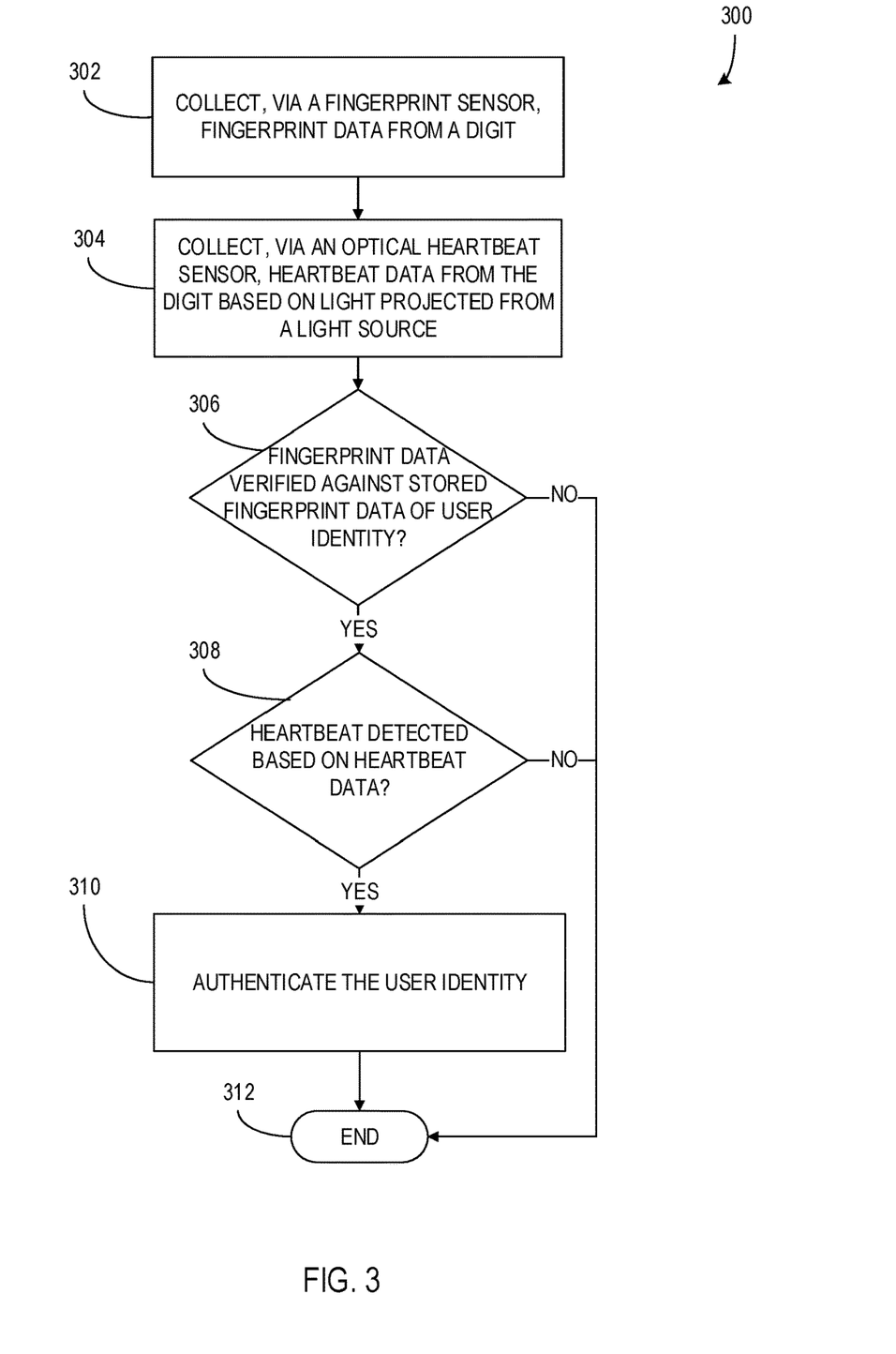
FIG. 3 is an exemplary flow chart illustrating authenticating a user identity based on fingerprint and heartbeat data according to an embodiment.

FIG. 3 is an exemplary flow chart 300 illustrating authenticating a user identity based on fingerprint and heartbeat data according to an embodiment. The user authentication of flow chart 300 may be executed on, for instance, a mobile phone, a tablet, a laptop, a wearable computing device, or the like. At 302, fingerprint data is collected from a digit via a fingerprint sensor (e.g., fingerprint sensor 206, etc.). The fingerprint data may include optical data based on a reflection of light from the digit to the sensor and/or contact-based data or data points collected by a contact-based fingerprint sensor. The fingerprint data collection may be triggered based on the digit being placed onto or in proximity to the fingerprint sensor. At 304, heartbeat data is collected from a digit, via an optical heartbeat sensor, based on light projected from a light source. The light may be projected into the tissue of the digit as described above. In some examples, the fingerprint data and heartbeat data are collected simultaneously or within a defined time period (e.g., the fingerprint data and heartbeat data are collected within 3 seconds of each other, etc.).

At 306, the collected fingerprint data is verified against stored fingerprint data associated with a user identity (e.g., via the fingerprint verifier 218, etc.). If the collected fingerprint data is found to match the stored fingerprint data, the collected heartbeat data is analyzed to determine if a heartbeat is detected at 308 (e.g., via the heartbeat detector 220, etc.). If a heartbeat is detected, the user identity is authenticated at 310. If the collected fingerprint data does not match the stored fingerprint data at 306 and/or the heartbeat is not detected at 308, the process ends at 312 and the user identity is not authenticated.

In some examples, the heartbeat data may be checked (e.g., at 308, etc.) prior to the collected fingerprint data being verified against the stored fingerprint data (e.g., at 306, etc.). Alternatively, the heartbeat data and fingerprint data may be verified substantially simultaneously.

The authentication of the user identity may be used for different purposes with respect to a computing device (e.g., computing device 200, etc.). For instance, the user identity authentication may enable the unlocking of the computing device, confirmation of a transaction or fund transfer, accessing settings of the computing device, or signing in to an application on the computing device. Other actions may also be enabled by the user identity authentication process described herein.

Figure 4:
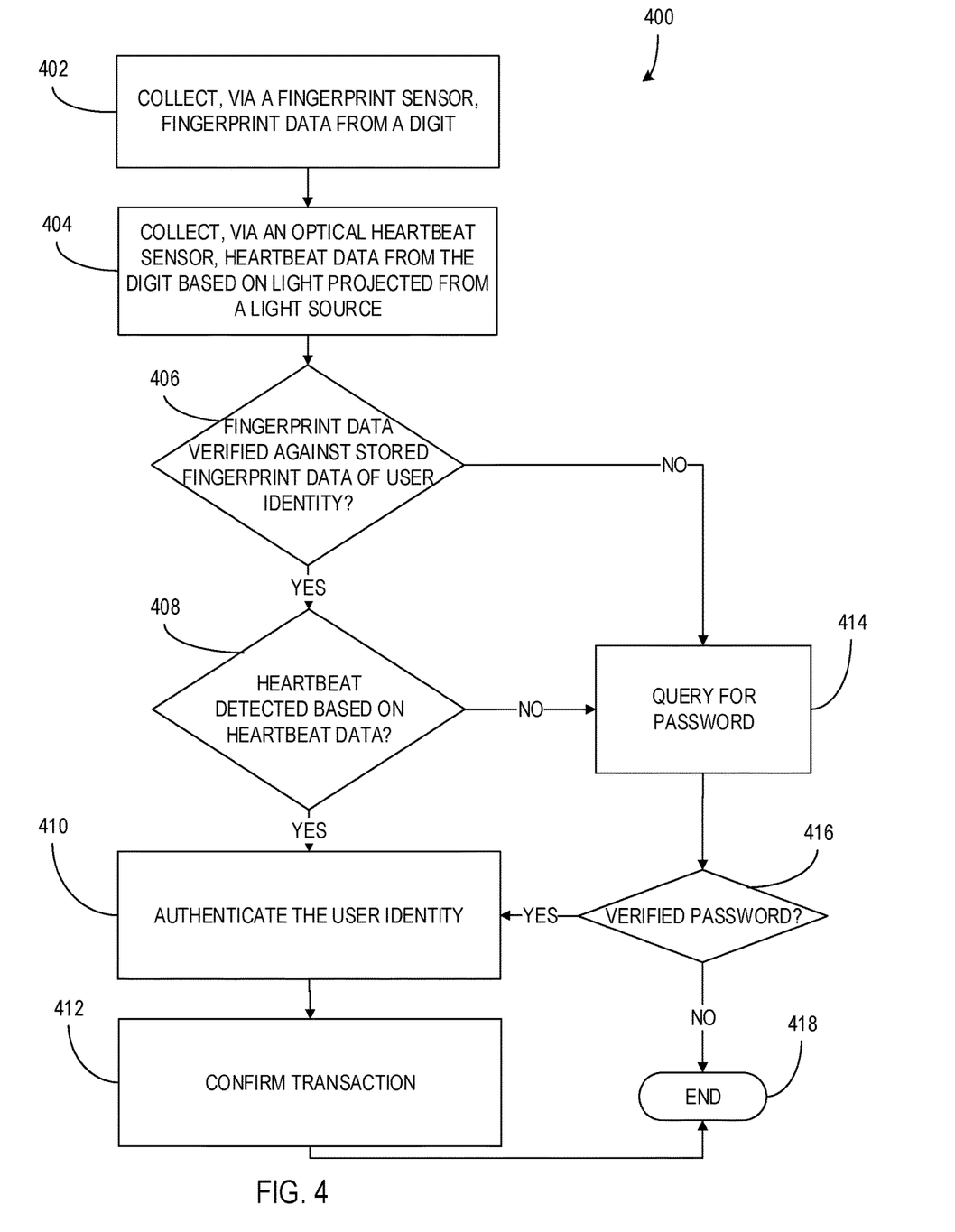
FIG. 4 is an exemplary flow chart illustrating confirming a transaction based on fingerprint and heartbeat data according to an embodiment.

FIG. 4 is an exemplary flow chart 400 illustrating confirming a transaction based on fingerprint and heartbeat data according to an embodiment. The confirmation of flow chart 400 may be executed on the same devices mentioned above with respect to flow chart 300. At 402, fingerprint data is collected from a digit via a fingerprint sensor and, at 404, heartbeat data is collected from the digit via an optical heartbeat sensor based on light projected from a light source as described above. At 406, the collected fingerprint data is verified against stored fingerprint data associated with a user identity. If the collected fingerprint data is found to match the stored fingerprint data, the heartbeat data is used to determine whether a heartbeat is detected at 408. If the heartbeat is detected at 408, the user identity is authenticated at 410 as described above. The transaction is confirmed based on the authenticated user identity at 412 and the process ends at 418.

If the collected fingerprint data does not match the stored fingerprint data at 406 and/or the heartbeat is not detected at 408, a query for a password is provided to the user at 414. The query may be displayed on a user interface and the user may be enabled to provide a password as input to the query via a keyboard, touchscreen, or the like. Upon receipt, the password is verified at 416. If the password is successfully verified, the user identity is authenticated at 410, but if the password is not verified, the process ends at 418.

In some examples, when the fingerprint data verification and/or the heartbeat detection fails but a provided password is verified, the threshold(s) for verifying fingerprint data and/or detecting heartbeats may be adjusted to accommodate similar fingerprint data and/or heartbeat data in the future. For instance, the match threshold for matching fingerprint data may be reduced generally such that fingerprint data similar to the collected fingerprint data is more likely to satisfy the fingerprint data verification in future attempts. Alternatively, or additionally, the collected fingerprint data may be stored with the stored fingerprint data such that collected fingerprint data in future authentications may be compared against it. Similarly, the collected heartbeat data may be stored with other stored heartbeat data for comparison with collected heartbeat data during future authentications.

Further, prior to the collected fingerprint data or heartbeat data being stored and/or being used to adjust threshold(s) for future verification, the user may be asked to confirm that the action should be taken. For instance, if the user tried to use the wrong finger for authentication, the verification failed, and the user then provided a password to complete the authentication, a user interface of the computing device may display a dialog box asking the user to confirm that the fingerprint data from the finger used should be stored or otherwise used to adjust thresholds. If the user does not want that finger to be used for authentication in the future, the user may decline using the dialog box. Alternatively, if the user would like the finger to be used for authentication in the future, the user may confirm that the fingerprint data from the finger should be stored with the stored fingerprint data and/or used to adjust threshold(s) as described.

Additional Example Scenarios

Aspects of the disclosure enable various additional scenarios, such as next described.

In an example, a user attempts to unlock her mobile phone using fingerprint authentication. She places her right thumb on a sensor region of her mobile phone and holds it there for several seconds. While the user's thumb is on the sensor region, a light source illuminates her thumb. A fingerprint sensor collects fingerprint data from the reflection of the light from the user's thumb and a heartbeat sensor collects heartbeat data based on variations in the reflections of the light from blood vessels in the user's thumb. The user's fingerprint data is matched against stored fingerprint data associated with the user's identity on the mobile phone and the user's heartbeat is detected based on the heartbeat data. Based on the matched fingerprint data and the detected heartbeat, the user's identity is authenticated and the mobile phone is unlocked for use.

In another example, a user wants to confirm a payment transaction in a shopping application on her mobile phone using fingerprint authentication. The user selects to confirm the payment transaction and the mobile phone prompts the user to provide her fingerprint. She places her right index finger onto the sensor region associated with the fingerprint sensor and heartbeat sensor of the mobile phone. The user's identity includes an authentication setting configured to enable the user to confirm payment transactions in the shopping application with multiple digits, including her right index finger. The fingerprint and heartbeat sensors collect the fingerprint data and heartbeat data simultaneously as described herein. When the fingerprint data and heartbeat data are verified, the user's identity is authenticated and the payment transaction in the shopping application is confirmed.

In another example, a user wants to confirm a peer-to-peer money transfer to her friend using an application on her mobile phone. The user's identity stored on the mobile phone includes an authentication setting that enables her to confirm money transfers in this application with her left index finger. When prompted, the user places her right index finger onto a sensor region associated with a fingerprint sensor and a heartbeat sensor. The fingerprint data and heartbeat data are collected by the sensors as described herein. Because the user used the wrong finger to confirm the money transfer, the fingerprint data is not successfully verified. The mobile phone notifies the user that the authentication has failed and prompts her to try again or, alternatively, provide a password for verification. The user tries the fingerprint verification again with her left index finger and her identity is successfully authenticated, enabling her to confirm the money transfer.

In another example, a user attempts to log in to her banking application on her mobile phone to view her account balance. Her user identity includes an authentication setting associated with her banking application that enables her to log in to the banking application without authentication when her mobile phone is connected to a trusted Wi-Fi network. She is currently away from home and is only connected on a cellular network, so when she activates the banking application, she is prompted to authenticate her identity with her fingerprint. She places her right thumb on the sensor region of her mobile phone and her identity is authenticated based on her fingerprint and heartbeat as described herein. She is then successfully logged in to her banking application and can check her account balance. On the next day, when she is at home and connected to her trusted Wi-Fi network, she attempts to check her account balance again. Because of the authentication setting described above, she can access her banking application and account balance without fingerprint authentication.

In another example, a user attempts to confirm a transaction on a shopping application of her mobile phone. She provides a fingerprint and heartbeat data via sensors in the mobile phone as described herein. The verification of the fingerprint fails due to the user orienting her finger differently on the sensor than usual. The mobile phone notifies the user that the fingerprint authentication has failed and requests a password from the user. The user provides a password and successfully authenticates her identity. The mobile phone then prompts the user as to whether the collected fingerprint data that failed to be verified should be saved as valid fingerprint data for future authentication. The user responds that the collected fingerprint data should be saved. At another time, the user may use the same finger in a similar orientation for authentication and, because the fingerprint data was saved, it is more likely that the later verification will succeed.

In another example, a user attempts to access the settings of her mobile phone. The mobile phone prompts the user for fingerprint authentication and the user provides fingerprint data and heartbeat data as described herein. The user's identity is authenticated based on the fingerprint data and heartbeat data and she is able to access the settings. The user's identity includes an authentication setting that enables the user to be automatically authenticated for a defined time period after a successful authentication based on fingerprint data and heartbeat data. The user then activates a social media application and attempts to log in. She would usually be prompted to provide a fingerprint to authenticate her identity during the log in process, but since she has recently (e.g., within the defined time period, etc.) been authenticated when accessing the settings of her phone, she is automatically authenticated for logging in to her social media application.

Exemplary Operating Environment

Figure 5:
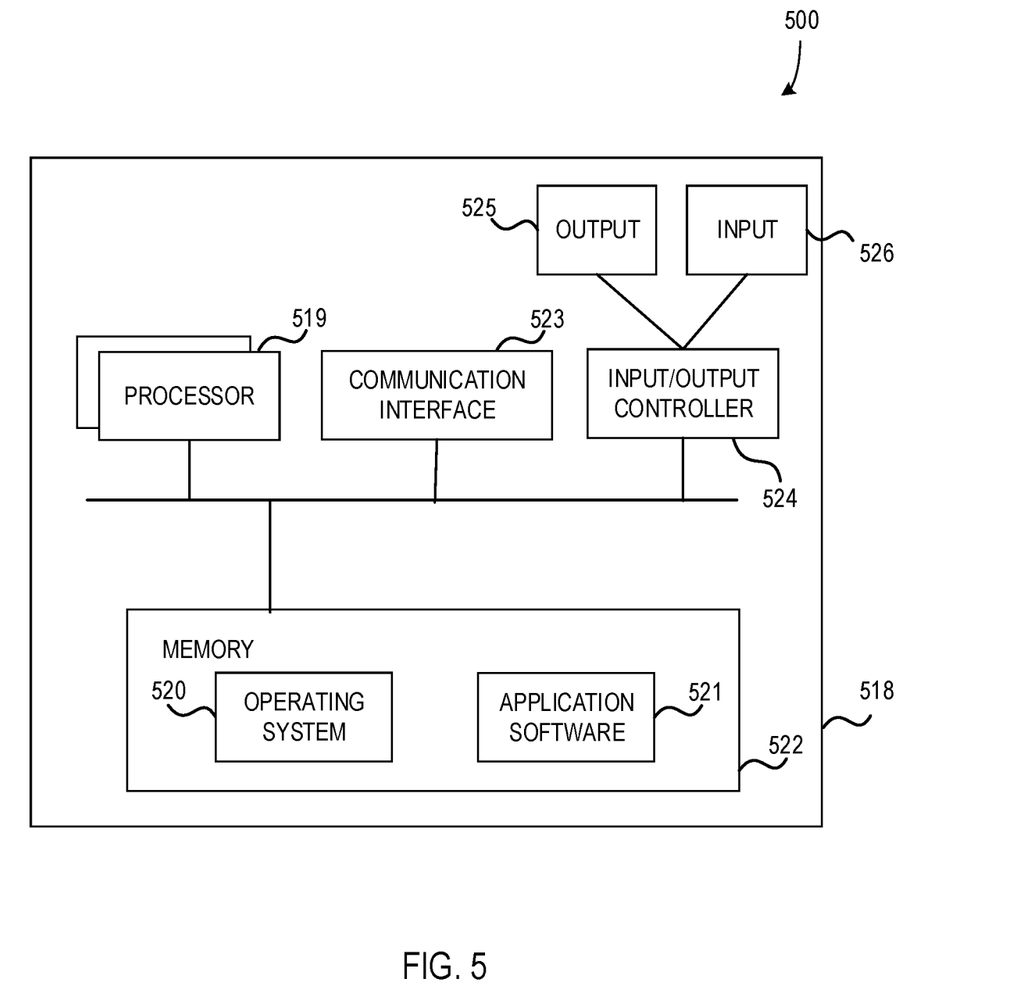
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, verifying a user identity based on fingerprint and heartbeat data may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for authenticating a user identity comprising:
at least one processor;
a fingerprint sensor;
an optical heartbeat sensor having a light source; and
at least one memory comprising computer program code, the at least one memory and the computer program code configured to, with the at least one processor, cause the at least one processor to:
  receive, from the fingerprint sensor, fingerprint data from a digit;
  receive, from the optical heartbeat sensor, heartbeat data from the digit based on light projected from the light source;
  verify the received fingerprint data by comparison to stored fingerprint data associated with the user identity;
  detect a heartbeat based on the heartbeat data; and
  based on a successful verification of the received fingerprint data and a successful detection of the heartbeat, authenticate the user identity.

The system described above, wherein the fingerprint sensor is an optical sensor and the fingerprint data is received from the fingerprint sensor based on light projected from the light source.

The system described above, wherein the received fingerprint data and received heartbeat data are received simultaneously.

The system described above, wherein verifying the received fingerprint data by comparison to stored fingerprint data associated with the user identity includes verifying the received fingerprint data based on a defined match threshold of the stored fingerprint data.

The system described above, wherein the stored fingerprint data associated with the user identity includes fingerprint data associated with a plurality of digits.

The system described above, wherein authenticating the user identity is associated with an authentication purpose and the user identity includes an authentication setting associated with the authentication purpose that defines the plurality of digits of the stored fingerprint data.

The system described above, wherein detecting a heartbeat based on the received heartbeat data includes detecting a heart rate based on the heartbeat data; and
wherein the user identity includes an authentication setting that requires detection of a heart rate within a prescribed heart rate range based on the received heartbeat data, such that authentication of the user identity requires detection of a heart rate within the prescribed heart rate range.

The system described above, the at least one memory and the computer program code configured to, with the at least one processor, further cause the at least one processor to:
  query for a password based on an unsuccessful verification of the received fingerprint data or unsuccessful detection of the heartbeat; and
  based on successful verification of the queried password, authenticate the user identity.

The system described above, wherein based on successful verification of the queried password, the stored fingerprint data is updated to include the received fingerprint data.

A computerized method for authenticating a user identity, the method comprising:

collecting, via a fingerprint sensor, fingerprint data from a digit;

collecting, via an optical heartbeat sensor, heartbeat data from the digit based on light projected from a light source;

verifying, by a processor, the collected fingerprint data by comparison to stored fingerprint data associated with the user identity;

detecting, by the processor, a heartbeat based on the collected heartbeat data; and based on a successful verification of the fingerprint data and a successful detection of the heartbeat, authenticating the user identity.

The computerized method described above, wherein the fingerprint sensor is an optical sensor and the fingerprint data is received from the fingerprint sensor based on light projected from the light source.

The computerized method described above, wherein the collected fingerprint data and collected heartbeat data are collected simultaneously.

The computerized method described above, wherein verifying the collected fingerprint data by comparison to stored fingerprint data associated with the user identity includes verifying the collected fingerprint data based on a defined match threshold of the stored fingerprint data.

The computerized method described above, wherein the stored fingerprint data associated with the user identity includes fingerprint data associated with a plurality of digits.

The computerized method described above, wherein authenticating the user identity is associated with an authentication purpose and the user identity includes an authentication setting associated with the authentication purpose that defines the plurality of digits of the stored fingerprint data for comparison to the collected fingerprint data.

The computerized method described above, wherein the authentication purpose includes one of unlocking a computing device, confirming a transaction, accessing settings, or signing in to an application.

The computerized method described above, further comprising:

querying for a password based on an unsuccessful verification of the received fingerprint data or unsuccessful detection of the heartbeat; and based on successful verification of the queried password, authenticating the user identity.

The computerized method described above, wherein based on successful verification of the queried password, the stored fingerprint data is updated to include the collected fingerprint data.

One or more computer storage media having computer-executable instructions for authenticating a user identity that, upon execution by a processor, cause the processor to at least:

receive, from a fingerprint sensor, fingerprint data from a digit;

receive, from an optical heartbeat sensor, heartbeat data from the digit based on light projected from the light source;

verify the received fingerprint data by comparison to stored fingerprint data associated with the user identity;

detect a heartbeat based on the received heartbeat data; and based on a successful verification of the received fingerprint data and a successful detection of the heartbeat, authenticate the user identity.

The one or more computer storage media described above, wherein the fingerprint sensor is an optical sensor and the fingerprint data is received based on light projected from the light source; and wherein the received fingerprint data and the received heartbeat data are collected simultaneously.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for authenticating a user identity based on fingerprint and heartbeat data, including means for collecting fingerprint data from a digit via a fingerprint sensor (e.g., fingerprint sensor 106, etc.), means for collecting heartbeat data from the digit based on light projected from a light source (e.g., light source 110, etc.) via an optical heartbeat sensor (e.g., heartbeat sensor 108, etc.), means for verifying, by a processor (e.g., a processor 519, etc.), the collected fingerprint data by comparison to stored fingerprint data associated with the user identity, means for detecting, by the processor, a heartbeat based on the collected heartbeat data, and means for authenticating the user identity based on successful verification of the fingerprint data and a successful detection of the heartbeat. The illustrated one or more processors 519 together with the computer program code stored in memory 522 constitute exemplary processing means authenticating a user identity based on fingerprint and heartbeat data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for authenticating a user identity of a user, the system comprising:
    at least one processor;
    a fingerprint sensor;
    an optical heartbeat sensor having a light source; and
    at least one memory comprising computer program code, the at least one memory and the computer program code configured to, with the at least one processor, cause the at least one processor to:
        receive, from the fingerprint sensor, fingerprint data from a digit;
        receive, from the optical heartbeat sensor, heartbeat data from the digit based on light projected from the light source;
        verify the received fingerprint data by comparison to stored fingerprint data associated with the user identity;
        detect a heart rate based on the received heartbeat data from the optical heartbeat sensor;
        verify the detected heart rate, based on the received heartbeat data from the optical heartbeat sensor, is within a prescribed heart rate range associated with the user identity, the prescribed heart rate range being adjusted, based on a historical average of anonymized heart rate data associated with a plurality of users;
        based on a successful verification of the received fingerprint data and a successful verification of the detected heart rate within the prescribed heart rate range associated with the user identity, authenticate the user identity; and
        flag a user transaction, based on the authenticated user identity, for suspicious activity based on the detected heart rate.

2. The system of claim 1, wherein the user identity includes authentication settings that enable the user to authenticate using different digits for different types of authentication.

3. The system of claim 1, wherein the received fingerprint data and received heartbeat data are received simultaneously.

4. The system of claim 1, wherein verifying the received fingerprint data by comparison to stored fingerprint data associated with the user identity includes verifying the received fingerprint data based on a defined match threshold of the stored fingerprint data, wherein the received heartbeat data is compared against the prescribed heart rate range associated with the user identity to verify that the digit provided to the fingerprint sensor is a legitimate digit of the user associated with the user identity.

5. The system of claim 1, wherein the stored fingerprint data associated with the user identity includes fingerprint data associated with a plurality of digits.

6. The system of claim 5, wherein authenticating the user identity is associated with an authentication purpose and the user identity includes an authentication setting associated with the authentication purpose that defines the plurality of digits of the stored fingerprint data.

7. The system of claim 1, the at least one memory and the computer program code configured to, with the at least one processor, further cause the at least one processor to:
    based on at least one of an unsuccessful verification of the received fingerprint data or an unsuccessful verification of the heart rate, query for a password; and
    on successful verification of the password, adjust at least one match threshold for verifying the received fingerprint data and the detected heart rate.

8. The system of claim 1, the at least one memory and the computer program code configured to, with the at least one processor, further cause the at least one processor to:
    query for a password based on an unsuccessful verification of the received fingerprint data or unsuccessful verification of the detected heart rate; and
    based on successful verification of the queried password, authenticate the user identity.

9. The system of claim 8, wherein based on successful verification of the queried password, the stored fingerprint data is updated to include the received fingerprint data.

10. A computerized method for authenticating a user identity of a user, the method comprising:
    collecting, via a fingerprint sensor, fingerprint data from a digit;
    collecting, via an optical heartbeat sensor, heartbeat data from the digit based on light projected from a light source;
    verifying, by a processor, the collected fingerprint data by comparison to stored fingerprint data associated with the user identity;
    detecting, by the processor, a heart rate based on the collected heartbeat data from the optical heartbeat sensor;
    verifying the detected heart rate is within a prescribed heart rate range associated with the user identity, the prescribed heart rate range being adjusted, based on a historical average of anonymized heart rate data associated with a plurality of users;
    based on a successful verification of the collected fingerprint data and a successful verification of the detected heart rate within the prescribed heart rate range, authenticating the user identity; and
    flagging a user transaction, based on the authenticated user identity, for suspicious activity based on the detected heart rate.

11. The computerized method of claim 10, wherein the fingerprint sensor is an optical sensor and the fingerprint data is received from the fingerprint sensor based on light projected from the light source.

12. The computerized method of claim 10, wherein the collected fingerprint data and collected heartbeat data are collected simultaneously.

13. The computerized method of claim 10, wherein verifying the collected fingerprint data by comparison to stored fingerprint data associated with the user identity includes verifying the collected fingerprint data based on a defined match threshold of the stored fingerprint data.

14. The computerized method of claim 10, wherein the stored fingerprint data associated with the user identity includes fingerprint data associated with a plurality of digits.

15. The computerized method of claim 14, wherein authenticating the user identity is associated with an authentication purpose and the user identity includes an authentication setting associated with the authentication purpose that defines the plurality of digits of the stored fingerprint data for comparison to the collected fingerprint data, wherein the authentication purpose includes one of unlocking a computing device, confirming a transaction, accessing settings, or signing in to an application.

16. The computerized method of claim 10, further comprising:
based on at least one of an unsuccessful verification of the collected fingerprint data or an unsuccessful verification of the detected heart rate, querying for a password; and
on successful verification of the password, adjusting at least one match threshold for verifying the collected fingerprint data.

17. The computerized method of claim 10, further comprising:
querying for a password based on an unsuccessful verification of the collected fingerprint data or an unsuccessful verification of the detected heart rate; and
based on successful verification of the queried password, authenticating the user identity.

18. The computerized method of claim 17, wherein based on successful verification of the queried password and based on unsuccessful verification of the collected fingerprint data, the stored fingerprint data is updated to include the collected fingerprint data.

19. One or more computer storage media having computer-executable instructions for authenticating a user identity of a user that, upon execution by a processor, cause the processor to at least:
receive, from a fingerprint sensor, fingerprint data from a digit;
receive, from an optical heartbeat sensor, heartbeat data from the digit based on light projected from a light source;
verify the received fingerprint data by comparison to stored fingerprint data associated with the user identity;
detect a heart rate based on the received heartbeat data from the optical heartbeat sensor;
verify the detected heart rate, based on the received heartbeat data from the optical heartbeat sensor, is within a prescribed heart rate range associated with the user identity, the prescribed heart rate range being adjusted, based on a historical average of anonymized heart rate data associated with a plurality of users;
based on a successful verification of the received fingerprint data and a successful verification of the detected heart rate within the prescribed heart rate range associated with the user identity, authenticate the user identity; and
flag a user transaction, based on the authenticated user identity, for suspicious activity based on the detected heart rate.

20. The one or more computer storage media of claim 19, wherein the fingerprint sensor is an optical sensor and the fingerprint data is received based on light projected from the light source; and
wherein the received fingerprint data and the received heartbeat data are received simultaneously.

* * * * *